(12) United States Patent
Polzin

(10) Patent No.: US 6,615,490 B2
(45) Date of Patent: *Sep. 9, 2003

(54) METHOD OF MANUFACTURE OF PAINT APPLICATION

(75) Inventor: Bruce C. Polzin, Greendale, WI (US)

(73) Assignee: Newell Operating Company, Freeport, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/766,110

(22) Filed: Jan. 19, 2001

(65) Prior Publication Data

US 2001/0045014 A1 Nov. 29, 2001

Related U.S. Application Data

(60) Provisional application No. 60/177,328, filed on Jan. 21, 2000.

(51) Int. Cl.⁷ ............................................... B23P 15/00
(52) U.S. Cl. .............................. 29/895.211; 29/895.21; 492/13
(58) Field of Search ................. 29/895.21, 895.211, 29/895; 492/56, 13; 15/230.11; 156/187

(56) References Cited

U.S. PATENT DOCUMENTS

| | | | |
|---|---|---|---|
| 1,944,970 A | 1/1934 | Dieffenbach | |
| 2,708,763 A | 5/1955 | Jacoby | |
| 2,823,402 A | 2/1958 | Phillips | |
| 2,891,301 A | 6/1959 | Conklin | |
| 2,959,800 A | 11/1960 | Bischoff | |
| 3,010,867 A | * 11/1961 | Sannipoli et al. | 156/367 |
| 3,126,306 A | 3/1964 | Sherman | |
| 3,280,516 A | 10/1966 | Kimmerle | |
| 3,366,719 A | 1/1968 | Lueders | |
| 3,394,423 A | 7/1968 | Bischoff | |
| 3,428,239 A | 2/1969 | Wannamaker et al. | |
| 3,457,130 A | 7/1969 | Morrison | |
| 3,494,989 A | 2/1970 | Le May | |
| 3,524,779 A | 8/1970 | Masters et al. | |
| 3,555,976 A | 1/1971 | Carter et al. | |
| 3,607,492 A | * 9/1971 | Keith et al. | 165/170 |
| 3,620,869 A | 11/1971 | Stump et al. | |
| 3,700,520 A | 10/1972 | Hielema | |

(List continued on next page.)

FOREIGN PATENT DOCUMENTS

| | | |
|---|---|---|
| DE | 1928269 | 12/1970 |
| DE | 3616114 | 11/1987 |
| DE | 3903519 | 8/1990 |
| FR | 1059649 | 11/1953 |
| JP | 0015816 | 4/1986 |

*Primary Examiner*—I Cuda-Rosenbaum
(74) *Attorney, Agent, or Firm*—Marshall, Gerstein & Borun

(57) ABSTRACT

Roller covers and methods for manufacturing such roller covers are disclosed. According to one method, a paint carrying medium is secured to a core material to form a composite material having at least one core layer and a paint-carrying layer, wherein the composite material has opposite edges. The opposite edges are positioned adjacent to one another and are secured together. According to an alternative method, a paint-carrying medium having a backing is provided. The backing is treated to an adhering state and is applied to a core while the backing is in the adhering state. According to yet another method, a paint-carrying medium having a backing including opposite edges is provided. The opposite edges are positioned adjacent to one another and are secured to one another. According to an alternative embodiment, a roller cover includes a paint-carrying medium and a core supporting the paint-carrying medium. The core includes a plurality of layers wherein at least two of the plurality of layers have different characteristics.

11 Claims, 4 Drawing Sheets

U.S. PATENT DOCUMENTS

| Patent | | Date | Inventor | Ref |
|---|---|---|---|---|
| 3,763,532 | A | 10/1973 | Smith | |
| 3,774,278 | A | 11/1973 | Ashton | |
| 3,877,123 | A | 4/1975 | Pharris | |
| 3,886,621 | A | 6/1975 | Welsh | |
| 3,886,622 | A | 6/1975 | Horst | |
| 4,010,054 | A | 3/1977 | Bradt | |
| 4,078,957 | A | 3/1978 | Bradt | |
| 4,107,247 | A | 8/1978 | Dukess | |
| 4,191,792 | A | 3/1980 | Janssen | |
| 4,192,697 | A | 3/1980 | Parker et al. | |
| 4,361,923 | A | 12/1982 | McKay | |
| 4,385,480 | A | 5/1983 | Burchette, Jr. | |
| 4,403,384 | A | 9/1983 | Fogle | |
| 4,627,127 | A | 12/1986 | Dupre | |
| 4,692,975 | A | 9/1987 | Garcia | |
| 4,729,807 | A | 3/1988 | Hede et al. | |
| 4,837,064 | A | 6/1989 | Tschudin-Mahrer | |
| 4,878,976 | A * | 11/1989 | Asakura | 156/190 |
| 4,937,141 | A | 6/1990 | Burns | |
| 5,022,112 | A | 6/1991 | Burns | |
| 5,024,712 | A | 6/1991 | Lecourt et al. | |
| 5,032,456 | A | 7/1991 | O'Brien et al. | |
| 5,090,084 | A | 2/1992 | De Guzman | |
| 5,106,356 | A | 4/1992 | Rhodes et al. | |
| 5,137,595 | A | 8/1992 | Garcia | |
| 5,158,986 | A | 10/1992 | Cha et al. | |
| 5,160,674 | A | 11/1992 | Colton et al. | |
| 5,195,242 | A | 3/1993 | Sekar | |
| 5,206,968 | A | 5/1993 | Bower et al. | |
| 5,273,604 | A * | 12/1993 | Alvarez Garcia | 15/230.12 |
| 5,334,356 | A | 8/1994 | Baldwin et al. | |
| 5,345,648 | A | 9/1994 | Graves | |
| 5,397,414 | A * | 3/1995 | Garcia et al. | 15/230.11 |
| 5,468,207 | A | 11/1995 | Bower et al. | |
| 5,468,531 | A | 11/1995 | Kikukawa et al. | |
| 5,471,703 | A | 12/1995 | Niven | |
| 5,613,265 | A | 3/1997 | Gemmell | |
| 5,619,769 | A | 4/1997 | Hutt | |
| 5,707,326 | A | 1/1998 | Hyllberg | |
| 5,855,715 | A | 1/1999 | Langford et al. | |
| 5,862,591 | A | 1/1999 | Kulkaski | |
| 5,866,053 | A | 2/1999 | Park et al. | |
| 6,051,174 | A | 4/2000 | Park et al. | |
| 6,059,095 | A | 5/2000 | Tsuji | |
| 6,077,207 | A | 6/2000 | Yokoyama et al. | |
| 6,145,196 | A | 11/2000 | Ripstein | |
| 6,175,985 | B1 * | 1/2001 | Chambers et al. | 15/230.11 |
| 6,199,280 | B1 * | 3/2001 | Schneider et al. | 101/415.1 |
| 6,203,648 | B1 * | 3/2001 | Barton et al. | 156/187 |
| 2002/0066521 | A1 * | 6/2002 | Sekar | 156/187 |
| 2002/0077234 | A1 * | 6/2002 | Sekar | 492/13 |

* cited by examiner

METHOD OF MANUFACTURE OF PAINT APPLICATION

CROSS REFERENCE TO RELATED APPLICATION

The present application claims priority under 35 U.S.C. §119(e) to co-pending U.S. Provisional Application Serial No. 60/177,328 entitled PAINT APPLICATOR AND METHOD OF MANUFACTURE THEREOF filed on Jan. 21, 2000, the full disclosure of which is hereby incorporated by reference.

FIELD OF THE INVENTION

The subject matter of the present invention relates to paint applicators and methods for manufacturing such paint applicators. In particular, the subject matter of the present invention relates to paint roller covers configured to fit upon a roller frame cage and various methods for manufacturing such paint roller covers.

BACKGROUND OF THE INVENTION

Roller covers are configured to be mounted upon a roller cage for applying paint or another liquid coating to a surface such as a wall. Roller covers typically include a relatively rigid core and a paint carrying fabric material secured to the core. The core is typically formed from a phenolic paperboard tube to which the fabric material is glued. Such roller covers quickly deteriorate in the relatively harsh solvents used during painting. As a result, many modern roller covers are formed from thermoplastic tubular cores which are resistant to solvents. The fabric material is adhered to such plastic cores by flame heating the exterior surface of the plastic cores to a temperature above the thermoplastic material's melting point and fusing the compatible fabric material to the core while the outer surface is in this adhesive state. Alternatively, a liquid thermoplastic material is applied to the exterior surface of the thermoplastic core and then the fabric material is applied to the core before the liquid thermoplastic material solidifies.

Although such roller covers having thermoplastic cores are extremely durable in some of the harshest solvents, such roller covers have several drawbacks. First, because the entire exterior surface of the thermoplastic tubular core must be heated or must have a liquid thermoplastic material applied to it, the tubular core is exposed to relatively high heats which cause shrinkage on the core and reduce dimensional stability. If the core shrinks too much, the core will not fit over the roller cage or processing equipment. If the core does not shrink enough, the core will undesirably slide along the cage or rotate relative to the cage during use.

Second, such covers having thermoplastic cores slide and rotate relative to the cage even if the desired dimensions are achieved. Most thermoplastic materials used to form cores are generally uncompressible and have a very low coefficient of friction. As a result, such cores slide along the axis of the cage and rotate relative to the cage during use.

Third, the manufacture of such covers having thermoplastic cores is time consuming and expensive. Making such covers involves wrapping a strip of fabric material about a pre-made thermoplastic core and adhering the strip of fabric material to the core. Such a process requires a large inventory of pre-made cores, whether wound or extruded, and a strip fabric material. In addition, forming adequate bonds between the fabric strip and the core requires extensive application of liquid thermoplastic material or extensive heating of the thermoplastic core. Regardless of which process is employed to secure the fabric strip to the core, manufacturing time and cost is increased. The manufacturing complexity is further increased where the core itself is formed from multiple plys which requires precise alignment of the core plys and the fabric plys and which requires two winding steps and one cutting step. Moreover, such processes require an extensive amount of expensive equipment including burners, winders, spools and the like. To date, none of these problems associated with roller covers having thermoplastic cores have been overcome.

SUMMARY OF THE INVENTION

Roller covers and methods for manufacturing such roller covers are disclosed. According to one method, a paint carrying medium is secured to a core material to form a composite material having at least one core layer and a paint-carrying layer, wherein the composite material has opposite edges. The opposite edges are positioned adjacent to one another and are secured together. According to an alternative method, a paint-carrying medium having a backing is provided. The backing is treated to an adhering state and is applied to a core while the backing is in the adhering state. According to yet another method, a paint-carrying medium having a backing including opposite edges is provided. The opposite edges are positioned adjacent to one another and are secured to one another. One embodiment of the roller cover includes a fabric strip having a liquid carrying and releasing medium secured to a backing. The strip has first and second opposite edges and is wound about an axis such that the backing is substantially circumferential. The first and second edges are secured to one another. According to an alternative embodiment, the roller cover includes a paint-carrying medium and a core supporting the paint-carrying medium. The core includes a plurality of layers wherein at least two of the plurality of layers have different characteristics with respect to at least one of resiliency, coefficient of friction or gripping, rigidity, solvent resistance, color, bondability, fusion characteristics such as melt point, curing characteristics, thermal conductivity, and liquid barrier characteristics. An alternative roller cover includes a paint-carrying medium and a core supporting the paint-carrying medium. The core includes an inner layer having a first stiffness per unit value, an outer layer having a second stiffness per unit value equal to or different than the first stiffness per unit value and an intermediate layer between the inner layer and the outer layer. The intermediate layer has a third stiffness per unit value greater than the first and second stiffness per unit values. An alternative roller cover includes a paint-carrying medium and a core supporting the paint-carrying medium. The core includes an inner layer formed from a first material having a first coefficient of friction and an outer layer formed from a second material having a second coefficient of friction, wherein the second coefficient of friction is less than the first coefficient of friction.

DETAILED DESCRIPTION

1. Composite Core/Fabric Strip Edge Fusing

Figure 1:
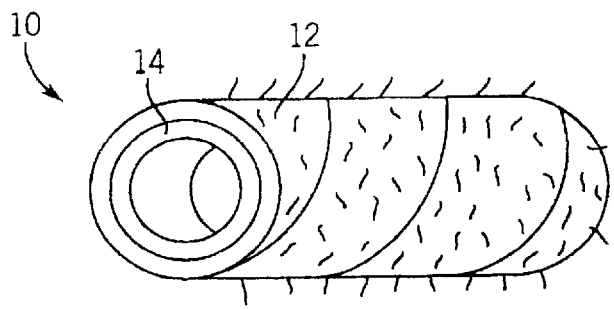
FIG. 1 is a perspective view of one exemplary embodiment of a roller cover according to the present invention.
Figure 2:
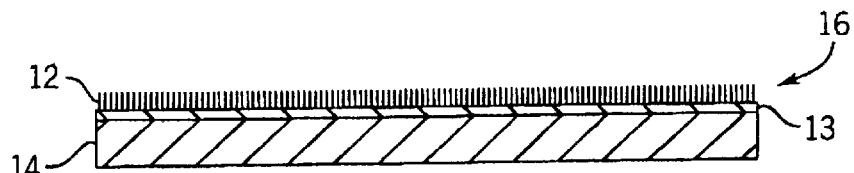
FIG. 2 is a sectional view of a composite core/fabric material used to form the roller cover of FIG. 1.
Figure 3:
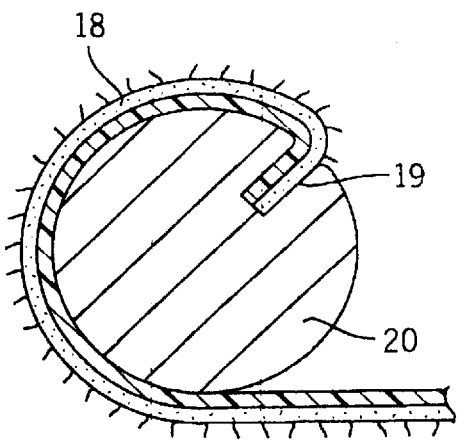
FIG. 3 is a sectional view illustrating a strip of the material of FIG. 2 being wound about a mandril.
Figure 4:
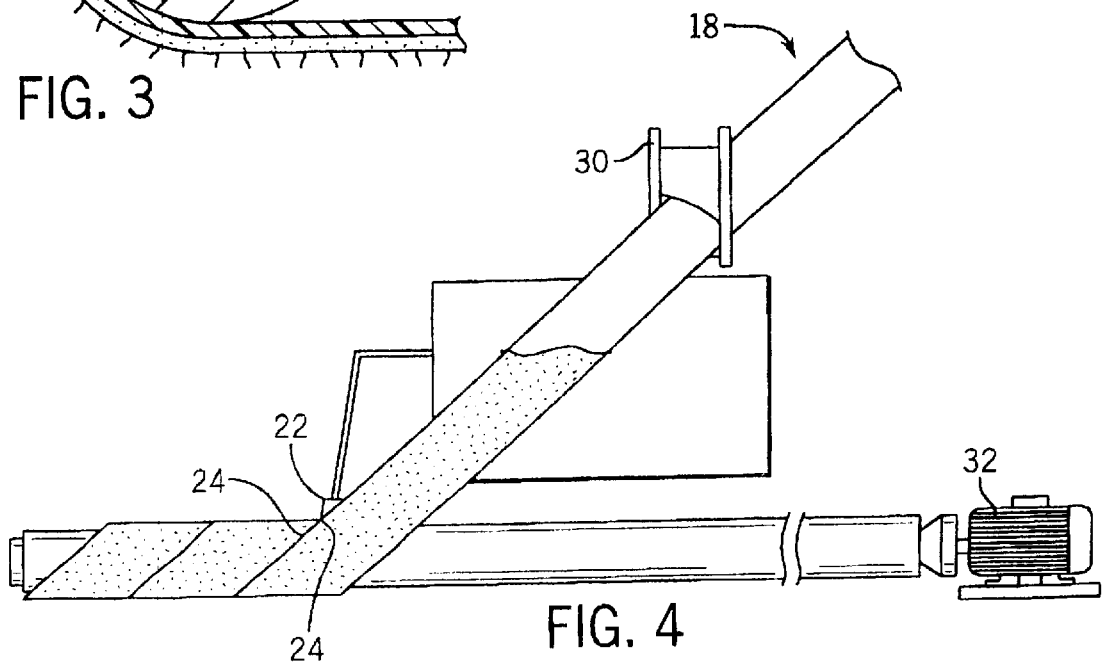
FIG. 4 is a side elevational view of a machine or apparatus configured for forming the roller cover of FIG. 1.

FIGS. 1–7 illustrate a process of forming a roller cover 10 shown in FIG. 1. According to the process, a paint carrying medium, such as a fabric nap or pile material 12 having a backing 13 that is pre-affixed to thermoplastic core material 14 to form a composite core/fabric material 16 (shown in FIG. 2). Material 16 is severed to form continuous strips 18. Alternatively, fabric material 12 and core material 14 may be pre-cut into strips and then secured to one another prior to winding. Strip 18 of material 16 is then wound about mandril 20 as shown in FIGS. 3 and 4. As the material 16 is wound about mandril 20, edges 24 are treated to an adhesive state and are positioned in close proximity to one another such that edges 24 of adjacent windings are secured to one another.

Figure 6:
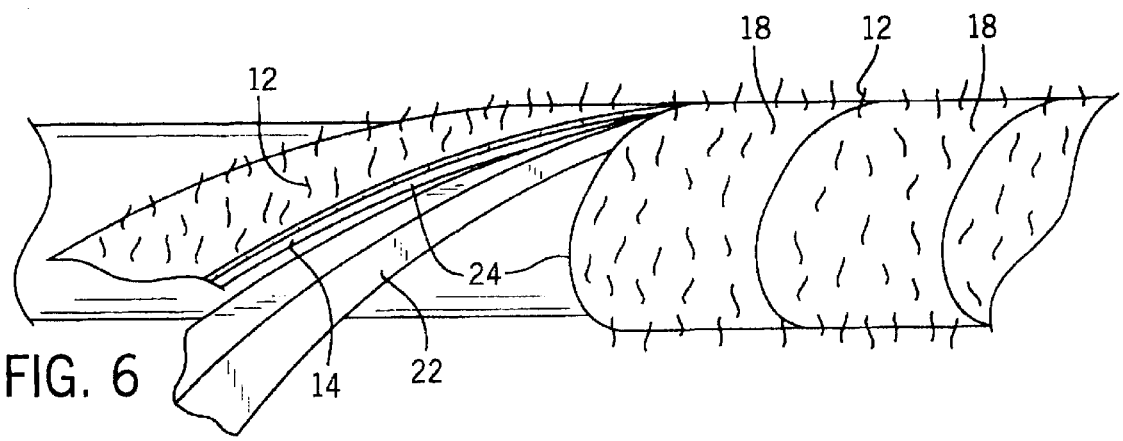
FIG. 6 is an enlarged fragmentary side elevational view of the apparatus of FIG. 4A illustrating the blade securing opposite edges of the material together to form the roller cover of FIG. 1 about a mandril.
Figure 7:
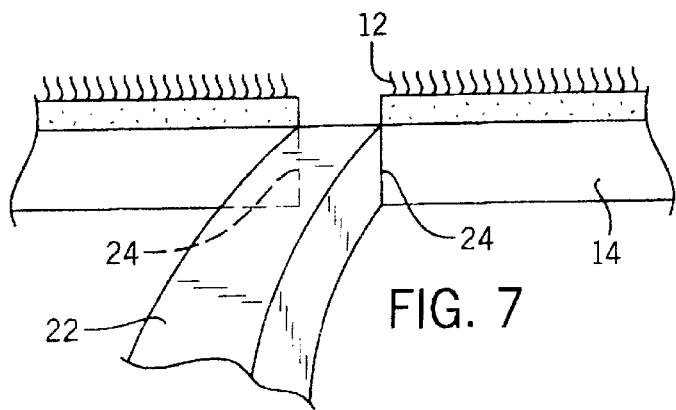
FIG. 7 is an enlarged side elevational view further illustrating the blade securing opposite edges of the material together to form the roller cover of FIG. 1.

In the exemplary method depicted in FIGS. 4–7, core material 14 comprises a single layer of thermoplastic material. A heated pin, knife or blade 22 extends into contact with one or both edges 24 of the thermoplastic core material 14 of adjacent windings to melt the thermoplastic core material 14 such that the windings of strip 18 fuse to one another as it is wound about the mandrel. FIGS. 6 and 7 illustrate heated blade 22 contacting edges 24 of the thermoplastic core material 14 to melt and fuse edges 24 to one another to form a wound tube. Once strip is wound the length of mandrel, the heater element is disengaged and unused composite core/fabric is cut leaving a wound tube. Once the wound tube has cooled, it is cut to desired lengths.

Although edges 24 are illustrated as being heated to enable edges 24 to be fused to one another, blade 22 may alternatively be replaced with a dispenser which dispenses an adhesive between adjacent winding edges 24 to adhere the edges 24 to one another. The adhesive dispensed between adjacent winding edges 24 is preferably compatible with core material 14 so as to bond adjacent winding edges 24 to one another. Such adhesives include, but are not limited, liquid thermoplastic adhesives such as polypropylene, hot melt, etc. or thermoset adhesives such as epoxy, urethanes, etc. Although less desirable, less solvent resistant adhesives or glues may also be employed.

The process illustrated in FIGS. 1–7 is but one exemplary embodiment. Multiple variations of the described process are also contemplated. For example, although FIGS. 1–7 depict core material 14 as generally comprising a single layer of somewhat rigid material such as polypropylene or polyethylene, core material 14 may alternatively comprise a composite of different materials such as described hereafter in section 5. In such an alternative embodiment, only one of the multiple layers of core material 114 needs to be thermoplastic material, wherein heated pin, knife or blade 22 extends into contact with edge 24 of the layer to fuse adjacent windings of strip 18 to one another. Adjacent layers of the multiple layer composite of core material 14 may be formed from non-thermoplastic materials. Furthermore, in applications where a liquid adhesive is dispensed between adjacent winding edges 24, it is not essential that any of the multiple layers of such a composite core material 14 be formed from a thermoplastic material. Moreover, whether formed from a single layer or formed from multiple layers, core material 14 may alternatively be formed from a non-rigid, preferably compressible, material such as described hereinafter in section 2. Preferably, the inner most layer of the multiple layer core material 14 is non-rigid and compressible to facilitate better adherence to the roller frame or roller cage.

In lieu of roller cover 10 being formed by spirally wrapping the strips of composite material 16, roller cover 10 may be formed by folding a generally rectangular panel about a cylindrical mandril and fusing or adhering opposite edges of the rectangular panel to one another to form the generally tubular roller cover.

FIGS. 3 and 4 generally depict a batch process in which once strip 18 has been completely wound about the length of mandril 20 with edges 24 being secured to one another either by fusion or by adhesive, the heater element or dispenser element is disengaged and unused material 16 is cut leaving a wound tube that, once sufficiently cooled, is further cut into desired lengths. As shown in FIG. 4, end 19 of strip 18 is secured to mandril 20 and mandril is rotated by rotary actuator 32 as strip 18 is supplied by feeder 28. In lieu of mandril 20 being rotated about its axis by rotary actuator 32, mandril 20 may alternatively be stationary as strip 18 is rotated about the axis of mandril 20.

Figure 4A:
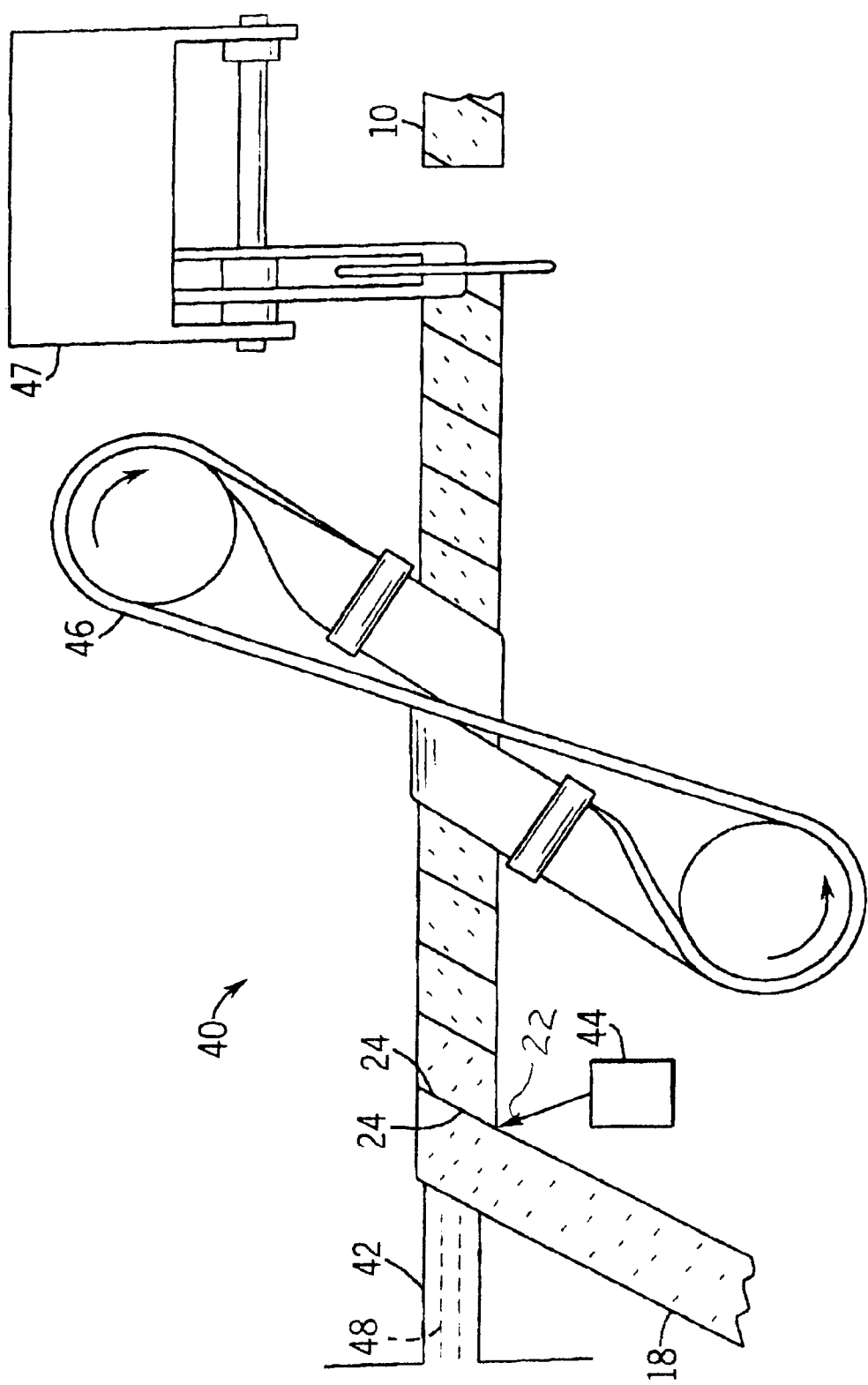
FIG. 4A is a side elevational view of an alternative machine or apparatus for forming the roller cover of FIG. 1
Figure 5:
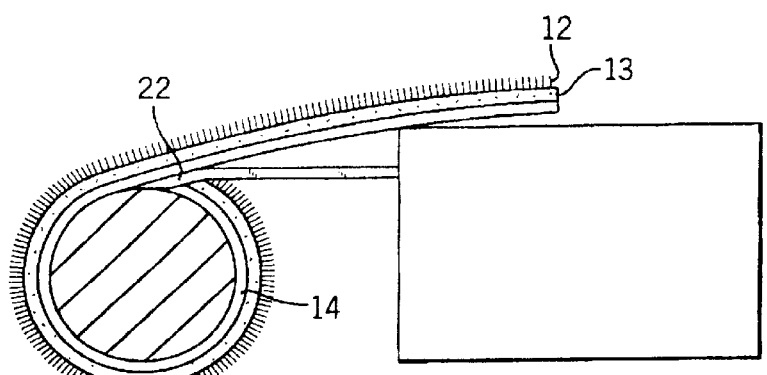
FIG. 5 is a sectional view of the apparatus of FIG. 4A.

Although roller cover 10 is illustrated in FIGS. 3 and 4 as being formed from the above-described batch process, core 10 may alternatively be formed continuously. FIG. 4A depicts an apparatus 40 configured to continuously wind and produce roller covers 10. Apparatus 40 generally includes mandril 42, edge treater 44, drive 46 and severing device 47. Mandril 42 comprises a conventionally known stationary cylindrical mandril extending from a feeder (not shown), which supplies strip 18 to mandril 42, to severing device 47.

Edge treater 44 extends adjacent to mandril 42 and comprises a device projecting into close proximity with and between adjacent edges 24 of strips 18. Treater 44 is configured to treat the adjacent edges 24 such that the adjacent edges 24 become secured to one another. In one embodiment, edge treater 44 includes a heated element such as a knife, blade or pin which melts thermoplastic material of strip 18 to fuse adjacent edges 24 to one another. In an alternative embodiment, surface treater 44 includes a dispenser configured to dispense a liquid adhesive between adjacent edges 24. Once adjacent edges 24 have been either partially melted and fused to one another or adhered to one another by a liquid adhesive, the partially melted thermoplastic material or the adhesive is allowed to solidify. In the exemplary embodiment, the solidification is enhanced by internally formed cooling or liquid cooling passages 48 that extend through mandril 42. As will be appreciated, in lieu of cooling the adhesive or melted thermoplastic material along edges 24 to solidify the material, various other means may also be used to solidify or set the material depending upon the type of adhesive applied between edges 24. Such alternative means may alternatively include heat, air, or various forms of radiation.

Once the adhesive or fused material between edges 24 has sufficiently solidified or set, drive 46 engages an outermost surface of the formed tube to both rotate the formed tube about mandril 42 and to also axially drive the formed tube towards severing device 47. In the exemplary embodiment, drive 46 comprises a conventionally known Ford drive. Alternatively, various other drive mechanisms may be employed.

Severing device 47 comprises a conventionally known saw configured to engage and cut through the tube to form roller covers 10 having a desired length. Because apparatus 40 forms roller covers 10 in a continuous fashion, apparatus 40 does not require production interruptions as does the batch process employed by apparatus 30.

In contrast to the aforementioned conventional roller cover manufacturing processes, the above-described processes apply the fabric to the core material before winding the fabric material. Because only the edges of the windings are heated or have an adhesive material applied thereto, shrinkage is reduced resulting in greater dimensional stability and less distortion. Because only the edges need to be heated, rather than the entire surface, the roller covers are produced at a much faster rate. Because the fabric and the core material are simultaneously wound and simultaneously cut, manufacturing through-put time is reduced. In addition, inventory levels are also reduced. Moreover, the number of manufacturing steps and the number and costs of manufacturing equipment is lessened. Because only edges 24 are secured to one another, less process control is required. Furthermore, because the fabric material is pre-secured to the core material, previously required alignment of plys is no longer necessary. In addition, the amount of equipment required to produce such a roller cover is reduced.

2. Roller Cover Having Non-Rigid Core

Figure 8:
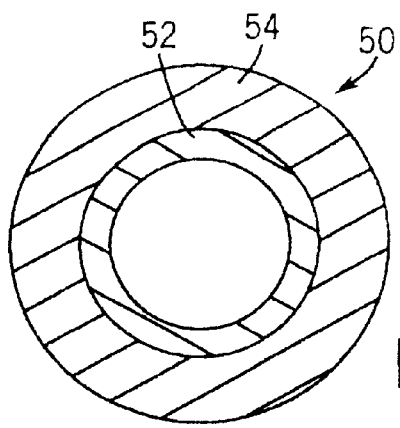
FIG. 8 is a sectional view of a first alternative embodiment of the roller cover of FIG. 1.

FIG. 8 depicts an alternative roller cover 50 formed by the above-described process or alternatively formed by conventional processes in which the core 52 is first formed and then the paint carrying medium, such as fabric 54, is applied to the core 52. The non-rigid core is advantageous in that it is substantially compressible so as to better adhere to the roller cage. The non-rigid core is preferably formed from a thermoplastic elastomeric material or from a thermoplastic foamed material. Because a foam material generally has a greater thickness has more surface texture and has more gripping, the core including the foam material has a greater outer diameter, increasing the carrying capacity at which paint or other liquids may be applied to a surface while maintaining a standard internal diameter to fit onto industry standard size frames.

3. Process of Forming Roller Cover by Heating/Applying Adhesive Material to Fabric Backing and Then Applying Backing to Pre-Made Core Under an alternative proposed concept, the fabric backing 13 is formed from a thermoplastic material and is heated to a temperature above its melting point. While above its melting point, the fabric backing is applied to a core 14 having a thermoplastic outer surface. In one embodiment, the fabric is secured by flame bonding or adhesive, etc. to a foam which serves as a backing. Only the exposed surface of the foam is heated to a point above its melting point while rest of backing and fabric remains below the melt temperature. The foam backing is then applied to a thermoplastic core to fuse the two together.

Alternatively, a suitable adhesive such as melted or liquid thermoplastic material (Propylene, ethylene, hot melt or thermoset material, etc.) may be applied to fabric backing 13 with the fabric backing 13 then being positioned against core 14 until the backing becomes bonded to core 14. To enhance this bond, both surfaces, backing and core can be heated or have the adhesive applied to them prior to coming in contact.

4. A Method of Forming Roller Cover by Fusing/Bonding Fabric Backing Edges

With this proposed method, a relatively thick solid or foamed, single layer or multiple layer, fabric backing is formed into strips and is then wrapped about a mandril. In a similar fashion to the process shown in FIGS. 1–7, a hot knife or blade is positioned between the strip edges to heat the edges of the fabric backing to a temperature above its melting point so as to fuse the edges together. In such an embodiment, the fabric backing serves as a core. Alternatively, an adhesive material may be deposited between edger 24 of consecutive strip wraps and then brought together to secure the fabric backing strips to one another.

These products/processes may include one or more layers of material to build up the backing/base material. Currently, fabric backing yarns are fairly thin, however, as fabric backing yarns or back coating compounds applied to the fabric backing yarns are increased sufficiently in thickness to act like the composite base, then products made from the above processes can be made directly from strips of fabric. While there is a wide range of material selection for the backing/base materials, products made from this process can be tuned to specific applications. While not all of the material combinations are listed here, one skilled in the art can select different materials for selected applications.

5. A Roller Cover Having Composite Core Material

Figure 9:
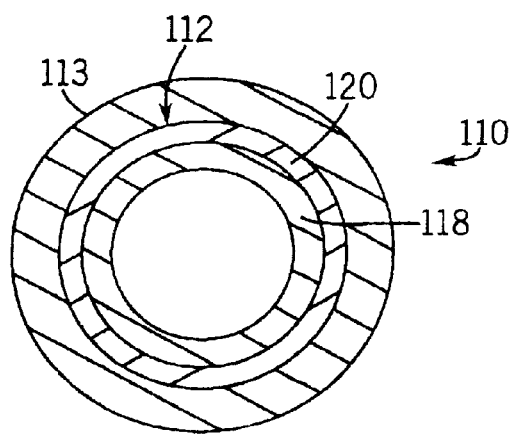
FIG. 9 is a sectional view of a second alternative embodiment of the roller cover of FIG. 1.

FIG. 9 illustrates a roller cover 110 having a core 112 and a fabric 113 affixed thereto by either a conventional process or one of the processes described above. Core 112 is formed from multiple layers fused or otherwise secured to one another to provide optimum paint roller characteristics. In the exemplary embodiment shown in FIG. 9, core 112 includes layers 118, 120. Layers 118, 120 may be formed from different materials or may be formed from substantially the same materials with slightly modified compositions so as to provide desirable characteristics. For example, layers 118 and 120 may preferably vary from one another so as to have different characteristics with respect to resiliency, coefficient of friction or gripping, rigidity, solvent resistance, color, bondability, fusing characteristics such as melt point, curing characteristics, thermal conductivity and liquid barrier characteristics. By varying the characteristics of layers 118 and 120, roller covers 110 optimally address the many different requirements for roller covers 110 in various applications.

In one exemplary embodiment, layer 118 comprises a phenolic paper while layer 120 comprises a thermoplastic or thermoset material resistant to solvents. Layer 118 enables core 112 to be better gripped by the roller cage to prevent slippage. Layer 120 prevents layer 118 from breaking up when exposed to harsh solvents and maintains a shape of roller cover 110.

In an alternative exemplary embodiment, layer 118 is formed from polyethylene while layer 120 is formed from polypropylene. Because layer 118 is formed from polyethylene, layer 118 is better gripped by the roller frame cage while layer 120 provides improved core flexibility to mate up with frame. This alternative embodiment also enables core 112 to be formed from materials having multiple colors for aesthetic reasons and for product source identifying purposes.

Figure 10:
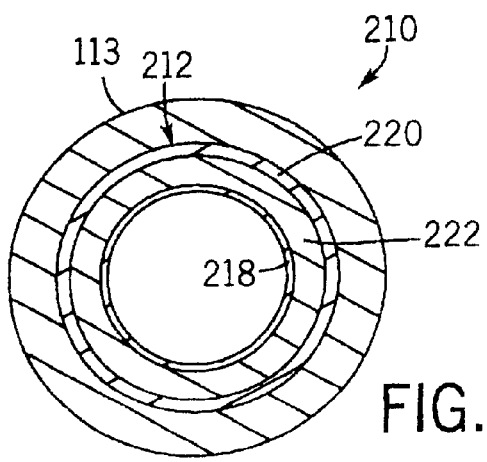
FIG. 10 is a third alternative embodiment of the roller cover of FIG. 1.

FIG. 10 illustrates yet another roller cover 210, an alternative embodiment of roller cover 110 shown in FIG. 9. Roller cover 210 is identical to roller cover 110 except that layers 118 and 120 are replaced with layers 218 and 220 which comprise relatively thin layers of a solvent resistant material such as thermosets (urethanes, epoxies) or thermoplastics (polyethylenes, polyprophylenes). Layers 218 and 220 have an intermediate stiffening layer 222 disposed therebetween. Stiffening layer 222 rigidifies the composite core 112 and enables layers 218 and 220 to have a greatly reduced thickness. In particular, layers 218 and 220 need merely have a sufficient thickness so as to serve as a solvent barrier protecting the less expensive and less solvent resistant stiffening layer disposed therebetween from contact with solvents and from degradation.

In one exemplary embodiment, layers 218 and 220 are fused or adhesively bonded to one another so as to encapsulate intermediate layer 222. In one exemplary embodiment, layer 220 is fused to fabric 113. In such an alternative embodiment, layer 220 also has a minimum sufficient thickness that enables layer 220 to be melted and fused with the backing of fabric 113. In one exemplary embodiment, intermediate layer 222 comprises a metal such as a foil or a conventionally known phenolic paper.

In one exemplary embodiment, layers 218, 220 and 222 continuously extend about the axis of roller cover 210 so as to be generally tubular and imperforate in nature. Alternatively, intermediate layer 222 may include circumferential or axial gaps along the length of core 212, whereby either or both of layers 218 and 220 fill such gaps or whereby such gaps are unfilled. Depending upon the material or materials selected for intermediate layer 222, layers 218 and 220 may also include circumferential or axial gaps at various locations along the length of roller cover 210. Although roller cover 210 is illustrated as including a core 212 having an intermediate layer sandwiched between two outer layers, core 212 may alternatively include greater than three layers and may include three layers wherein each layer is formed from a different material or a material having different compositions and characteristics.

Although the present invention has been described with reference to preferred embodiments, workers skilled in the art will recognize that changes may be made in form and detail without departing from the spirit and scope of the invention. For example, although different preferred embodiments may have been described as including one or more features providing one or more benefits, it is contemplated that the described features may be interchanged with one another or alternatively be combined with one another in the described preferred embodiments or in other alternative embodiments. Because the technology of the present invention is relatively complex, not all changes in the technology are foreseeable. The present invention described with reference to the preferred embodiments and set forth in the following claims is manifestly intended to be as broad as possible. For example, unless specifically otherwise noted, the claims reciting a single particular element also encompass a plurality of such particular elements.

What is claimed is:

1. A method for manufacturing a roller cover, the method comprising:

securing a paint carrying medium to a core material to form a composite material having at least one core layer and a paint carrying layer, the paint carrying layer including a backing, the composite material having opposite edges;

positioning the opposite edges adjacent to one another; and securing the opposite edges together, thereby forming said roller cover.

2. The method of claim 1 wherein the step of securing the opposite edges together includes applying an adhesive to at least one of the opposite edges.

3. The method of claim 2 wherein the adhesive is selected from the group of adhesives including thermoplastic adhesives, thermoset adhesives and non-thermoplastic/non-thermoset adhesives.

4. The method of claim 1 wherein the composite material has at least one thermoplastic layer and wherein the step of securing the opposite edges together includes fusing the at least one thermoplastic layer of at least one of the opposite edges.

5. The method of claim 1, wherein the positioning the opposite edges comprises helically winding the core material about an axis.

6. The method of claim 1, wherein the securing of the paint carrying medium to the core material step comprises:

treating the backing to an adhering state; and applying the backing to the core while the backing is in the adhering state.

7. The method of claim 6, wherein the backing comprises a thermoplastic backing.

8. The method of claim 1, wherein the composite material comprises a plurality of core layers.

9. The method of claim 1, wherein the composite material comprises an inner core layer having a first coefficient of friction and an outer core layer having a second coefficient of friction, wherein the second coefficient of friction is less than the first coefficient of friction.

10. The method of claim 1, wherein the securing the opposite edges together comprises providing a heated element in contact with one or more of said edges.

11. The method of claim 1, wherein the securing the opposite edges together comprises dispensing an adhesive between said edges.

* * * * *